US012703807B2

(12) United States Patent
Khalid

(10) Patent No.: US 12,703,807 B2
(45) Date of Patent: Aug. 11, 2026

(54) PAINT COMPOSITION

(71) Applicant: FLAME SECURITY INTERNATIONAL PTY LTD, Kensington (AU)

(72) Inventor: Arslan Khalid, Kensington (AU)

(73) Assignee: Flame Security International Pty Ltd, Kensington (AU)

( * ) Notice: Subject to any disclaimer, the term of this patent is extended or adjusted under 35 U.S.C. 154(b) by 66 days.

(21) Appl. No.: 18/532,917

(22) Filed: Dec. 7, 2023

(65) Prior Publication Data

US 2024/0132745 A1 Apr. 25, 2024
US 2024/0228821 A9 Jul. 11, 2024

Related U.S. Application Data

(63) Continuation of application No. PCT/AU2023/051002, filed on Oct. 11, 2023.

(30) Foreign Application Priority Data

Oct. 11, 2022 (AU) ................................ 2022902974

(51) Int. Cl.

| | |
|---|---|
| ***C09D 151/08*** | (2006.01) |
| ***C08K 3/04*** | (2006.01) |
| ***C08K 3/11*** | (2018.01) |
| ***C08K 3/22*** | (2006.01) |
| ***C08K 3/26*** | (2006.01) |
| ***C08K 3/32*** | (2006.01) |
| ***C08K 3/36*** | (2006.01) |
| ***C08K 5/053*** | (2006.01) |
| ***C08K 5/3492*** | (2006.01) |
| ***C09D 5/18*** | (2006.01) |
| ***E04B 1/94*** | (2006.01) |

(52) U.S. Cl.

CPC ........... *C09D 151/085* (2013.01); *C09D 5/18* (2013.01); *E04B 1/94* (2013.01); *C08K 3/042* (2017.05); *C08K 3/11* (2018.01); *C08K 2003/2224* (2013.01); *C08K 2003/2227* (2013.01); *C08K 2003/267* (2013.01); *C08K 2003/323* (2013.01); *C08K 3/36* (2013.01); *C08K 5/053* (2013.01); *C08K 5/34922* (2013.01); *C08K 2201/005* (2013.01)

(58) Field of Classification Search

None

See application file for complete search history.

(56) References Cited

U.S. PATENT DOCUMENTS 6,245,842 B1 * 6/2001 Buxton .................... C09D 5/18
524/495
2022/0235228 A1 7/2022 Watanabe

FOREIGN PATENT DOCUMENTS

| | | | | |
|---|---|---|---|---|
| CN | 102702875 | A | * | 10/2012 |
| CN | 106905818 | A | | 6/2017 |
| CN | 109401483 | A | * | 3/2019 |
| CN | 115058157 | A | | 9/2022 |
| JP | 2005161742 | A | * | 6/2005 |
| JP | 2019210307 | A | * | 12/2019 |
| WO | 2010054984 | A1 | | 5/2010 |
| WO | 2022088149 | A1 | | 5/2022 |

OTHER PUBLICATIONS

Zhu, CN-102702875-A, Oct. 3, 2012 (machine translation) (Year: 2012).*
Kamiya et al., JP-2005161742-A, Jun. 23, 2005 (machine translation) (Year: 2005).*
Harada et al., JP-2019210307-A, Dec. 12, 2019 (machine translation) (Year: 2019).*
Xie et al., CN-109401483-A, Mar. 1, 2019 (machine translation) (Year: 2019).*
Clariant, Exolit™ Product data sheet, Mar. 18, 2014 (Year: 2014).*
International Application No. PCT/AU2023/051002, International Search Report and Written Opinion mailed on Nov. 24, 2023, 10 pages.

* cited by examiner

*Primary Examiner* — Cheng Yuan Huang
(74) *Attorney, Agent, or Firm* — Kilpatrick Townsend & Stockton LLP

(57) ABSTRACT

Fire retardant paint compositions and coatings containing acrylic modified polysiloxane, polyphosphate salt, expandable graphite, and fire retardant additives are provided. The paint compositions find use in protecting a substrate against fire and exhibit excellent adhesion to substrates and long term weather resistance.

9 Claims, 3 Drawing Sheets

FIGURE 1

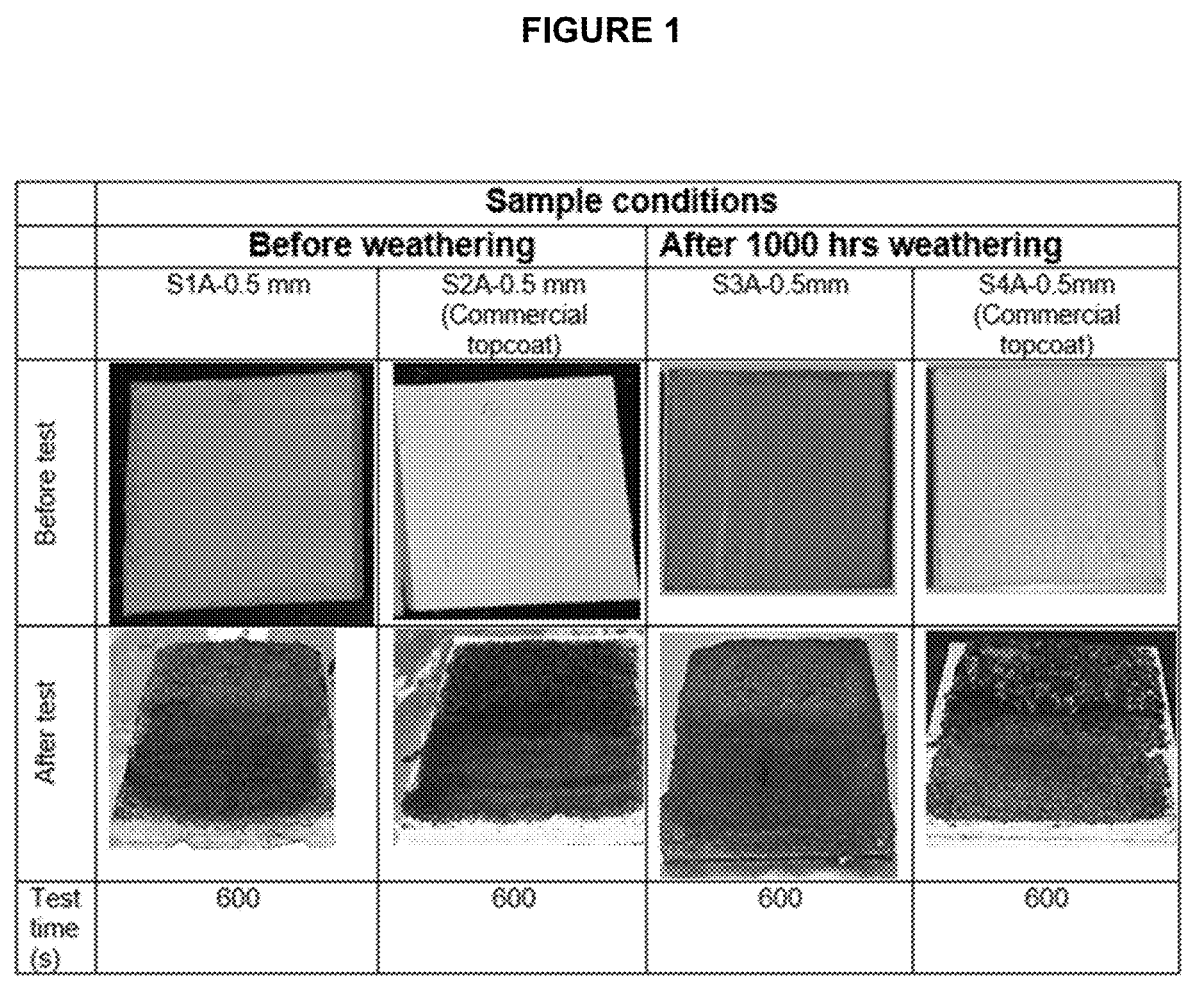

| | Sample conditions | | | |
|---|---|---|---|---|
| | Before weathering | | After 1000 hrs weathering | |
| | S1A-0.5 mm | S2A-0.5 mm (Commercial topcoat) | S3A-0.5mm | S4A-0.5mm (Commercial topcoat) |
| Before test | | | | |
| After test | | | | |
| Test time (s) | 600 | 600 | 600 | 600 |

FIGURE 3

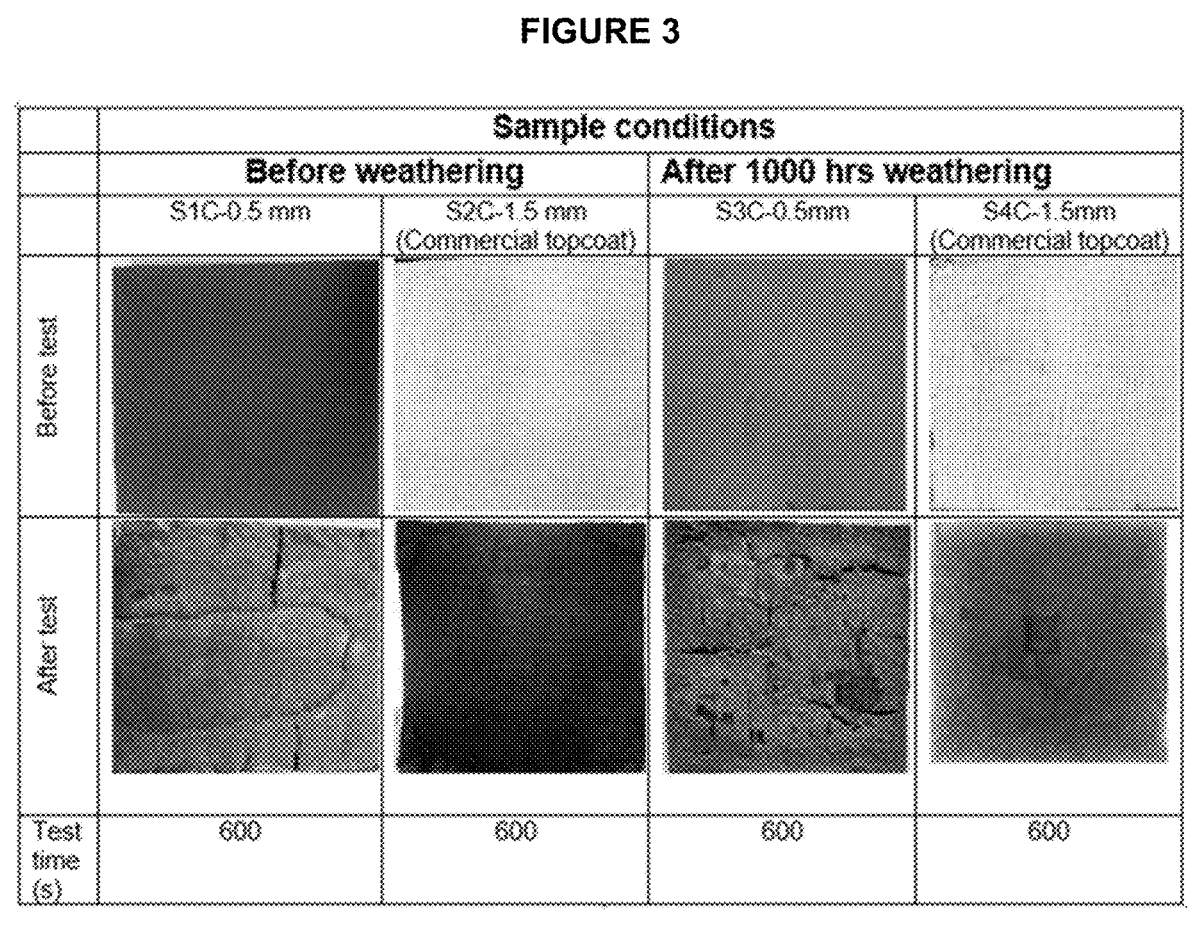

| | Sample conditions | | | |
|---|---|---|---|---|
| | Before weathering | | After 1000 hrs weathering | |
| | S1C-0.5 mm | S2C-1.5 mm (Commercial topcoat) | S3C-0.5mm | S4C-1.5mm (Commercial topcoat) |
| Before test | | | | |
| After test | | | | |
| Test time (s) | 600 | 600 | 600 | 600 |

PAINT COMPOSITION

CROSS-REFERENCE TO RELATED APPLICATIONS

The present application is a continuation of PCT/AU2023/051002, filed Oct. 11, 2023, which claims priority to AU 2022902974, filed Oct. 11, 2022, each of which is hereby incorporated by reference in its entirety.

FIELD OF THE DISCLOSURE

The present disclosure relates to fire retardant paint compositions containing acrylic modified polysiloxane, polyphosphate salt, expandable graphite, and fire retardant additives. When applied to a substrate the paint compositions provide fire retardant coatings useful in protecting a substrate against fire.

BACKGROUND OF THE DISCLOSURE

Fire retardant coatings act in a fire to insulate the substrate thereby extending the time before the substrate is damaged by fire. These coatings are often in the form of paint composition that is applied to the substrate, for example by brushing or spraying.

Such coatings may have intumescent properties such that they react to heat by swelling, producing a carbonaceous char that acts as an insulating layer to protect the substrate.

Fire retardant coatings desirably should have good adhesion to the substrate and further, for outdoor applications, should be resistant to weathering.

Australian standard AS 3959 (BAL-29) requires the use of bushfire-resistant timber to be used in aspects of construction. To classify a material as a bushfire-resisting timber for BAL-29, the following testing applies:

a) To satisfy the requirements for bushfire-resisting timber, timber shall be tested in accordance with AS/NZS 3837 (cone calorimeter test) and shall meet the following criteria:
   i) The maximum heat release rate shall be not greater than 100 kW/m$^2$.
   ii) The average heat release rate for 10 min following ignition shall be not greater than 60 kW/m$^2$ when the material is exposed to an irradiance level of 25 kW/m$^2$.
b) Where the timber has been altered by chemicals or coatings, the test samples shall be subjected to the regime of accelerated weathering described in Paragraph F (AS 3959). External fire retardant-coated substrates shall be subjected to the ASTM D2898 Method B weathering regime.

A large-scale test according to AS 1530.8.1 is performed with a BAL-40 rating (Heat flux of 35 kW/m$^2$) using a 3 m×3 m radiant heat panel. Different systems are assessed according to this standard, including external walls and power poles. The performance criteria change with the system, for example, external walls are required to pass seven criteria, such as the mean and maximum temperatures of the internal face of construction including cavities, which should not exceed 250° C. and 300° C. respectively between 20 min and 60 min after the commencement of the test. The performance criteria for power poles are reduced to two main criteria. Flaming is not permitted on the fire exposed side at the end of the 60 minutes period and the heat release shall not be greater than 3 kW/m$^2$ between 20 and 60 min of the test.

Accordingly, fire retardant coatings should desirably have properties that meet one or more of the above discussed standards.

Fire retardant coatings typically contain a number of components that work to address these property desires, however in view of the complexity of the compositions it is difficult, if not impossible, to predict performance in terms of strength of adhesion, resistance to weathering, and, ultimately, fire protection.

In view of the foregoing, there is a need for alternative fire retardant paint compositions and coatings derived therefrom.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In one aspect the present disclosure provides a fire retardant paint composition comprising:

(a) about 15 wt. % to about 50 wt. % of one or more acrylic modified polysiloxane binders;
(b) about 5 wt. % to about 30 wt. % expandable graphite;
(c) about 5 wt. % to about 30 wt. % of one or more polyphosphate salts having a solubility in water of less than 2 wt. % at 20° C.,
(d) about 5 wt. % to about 30 wt. % of one or more fire retardant additives; and the balance being water to 100 wt. %;

wherein the one or more acrylic modified polysiloxanes comprise a siloxane backbone functionalised with acrylic groups.

In embodiments, the fire retardant paint composition comprises:

(a) about 20 wt. % to about 45 wt. % of one or more acrylic modified polysiloxane binders;
(b) about 10 wt. % to about 20 wt. % expandable graphite;
(c) about 5 wt. % to about 20 wt. % of one or more polyphosphate salts having a solubility in water of less than 2 wt. % at 20° C.,
(d) about 5 wt. % to about 20 wt. % of one or more fire retardant additives; and the balance being water to 100 wt. %.

In embodiments, the fire retardant paint composition comprises:

(a) about 25 wt. % to about 40 wt. % of one or more acrylic modified polysiloxane binders;
(b) about 10 wt. % to about 20 wt. % expandable graphite;
(c) about 5 wt. % to about 20 wt. % of one or more polyphosphate salts having a solubility in water of less than 2 wt. % at 20° C.,
(d) about 5 wt. % to about 20 wt. % of one or more fire retardant additives; and the balance being water to 100 wt. %.

In embodiments, the one or more acrylic modified polysiloxanes comprise one or more of acrylic modified polydimethylsiloxane, acrylic modified polymethylhydrogensiloxane, acrylic modified polydiethylsiloxane, acrylic modified polyphenylmethylsiloxane, and acrylic modified polydiphenylsiloxane.

In embodiments, the one or more acrylic modified polysiloxanes comprise acrylic modified polydimethylsiloxane.

In embodiments, the one or more acrylic modified polysiloxanes comprise about 0.5 wt. % to about 10 wt. % acrylate groups.

In embodiments, the polyphosphate salt having a solubility in water of less than 2 wt. % at 20° C. is one or both of ammonium polyphosphate and melamine polyphosphate.

In embodiments, the one or more polyphosphate salts has a solubility in water of less than 1 wt. % at 20° C., or less than 0.5 wt. % at 20° C.

In embodiments, the one or more polyphosphate salts comprise a particulate polyphosphate having an average particle size (D50) of 5 to 50 micron, preferably 10 to 30 micron.

In embodiments, the one or more fire retardant additives comprise one or more of aluminium trihydrate, basic magnesium carbonate, and magnesium dihydroxide.

In embodiments, the fire retardant paint composition further comprises one or more auxiliaries selected from pigments, UV resistance additives, wetting agents, dispersing agents, biocides, rheology modifiers, coalescents, defoamers, and thickeners.

In embodiments, the amount of water in the fire retardant paint compositions may be from about 10 wt. % to about 30 wt. %, or from about 15 wt. % to about 25 wt. %, based on the total weight of the paint composition.

In another aspect, the present disclosure provides a fire retardant coating comprising:

(a) about 20 wt. % to about 60 wt. % of one or more acrylic modified polysiloxane binders;

(b) about 10 wt. % to about 30 wt. % expandable graphite;

(c) about 5 wt. % to about 30 wt. % of one or more polyphosphate salts having a solubility in water of less than 2 wt. % at 20° C., and (d) about 5 wt. % to about 30 wt. % of one or more fire retardant additives;

wherein the one or more acrylic modified polysiloxanes comprise a siloxane backbone functionalised with acrylic groups.

In embodiments, the fire retardant coating comprises:

(a) about 25 wt. % to about 55 wt. % of one or more acrylic modified polysiloxane binders;

(b) about 15 wt. % to about 25 wt. % expandable graphite;

(c) about 10 wt. % to about 20 wt. % of one or more polyphosphate salts having a solubility in water of less than 2 wt. % at 20° C., and (d) about 10 wt. % to about 20 wt. % of one or more fire retardant additives.

In embodiments, the fire retardant coating comprises:

(a) about 30 wt. % to about 50 wt. % of one or more acrylic modified polysiloxane binders;

(b) about 15 wt. % to about 25 wt. % expandable graphite;

(c) about 10 wt. % to about 20 wt. % of one or more polyphosphate salts having a solubility in water of less than 2 wt. % at 20° C., and (d) about 10 wt. % to about 20 wt. % of one or more fire retardant additives.

In embodiments, the amount of water in the fire retardant coating is less than 5 wt. %, or less than 4 wt. %, or less than 3 wt. %, or less than 2 wt. %, or less than 1 wt. %, or less than 0.5 wt. %, based on the total weight of the coating.

In embodiments, the one or more acrylic modified polysiloxanes comprise one or more of acrylic modified polydimethylsiloxane, acrylic modified polymethylhydrogensiloxane, acrylic modified polydiethylsiloxane, acrylic modified polyphenylmethylsiloxane, and acrylic modified polydiphenylsiloxane.

In embodiments, the one or more acrylic modified polysiloxanes comprise acrylic modified polydimethylsiloxane.

In embodiments, the one or more acrylic modified polysiloxanes comprise about 0.5 wt. % to about 10 wt. % acrylate groups.

In embodiments, the polyphosphate salt having a solubility in water of less than 2 wt. % at 20° C. is one or both of ammonium polyphosphate and melamine polyphosphate.

In embodiments, the one or more polyphosphate salts has a solubility in water of less than 1 wt. % at 20° C., or less than 0.5 wt. % at 20° C.

In embodiments, the one or more polyphosphate salts comprise a particulate polyphosphate having an average particle size (D50) of 5 to 50 micron, preferably 10 to 30 micron.

In embodiments, the one or more fire retardant additives comprise one or more of aluminium trihydrate, basic magnesium carbonate, and magnesium dihydroxide.

In embodiments, the fire retardant coating further comprises one or more auxiliaries selected from pigments, UV resistance additives, wetting agents, dispersing agents, biocides, rheology modifiers, coalescents, defoamers, and thickeners.

In another aspect the present disclosure provides a method of preparing a fire retardant paint composition comprising combining one or more acrylic modified polysiloxanes, expandable graphite, one or more polyphosphate salts, one or more fire retardant additives, and water.

In embodiments of the method, the combination is mixed under high shear conditions.

In another aspect the present disclosure provides a coated substrate wherein the coating comprises the fire retardant coating according to any one of the herein disclosed embodiments and the coating is in direct contact with the substrate.

In embodiments, the substrate is timber, brick, concrete or metal.

In embodiments, the coating has a thickness from about 0.2 mm to about 3 mm.

In embodiments, the adhesion strength of the coating to the substrate is greater than 1.5 MPa for a coating thickness of 0.5 mm.

In another aspect the present disclosure provides a coated substrate wherein the coating comprises a multilayer structure said multilayer structure comprising:

an optional first layer comprising a paint composition in contact with the substrate;

a second layer disposed atop the substrate or the first layer, said second layer comprising the fire retardant coating according to any one of the herein disclosed embodiments; and an optional third layer disposed atop the second layer, said third layer comprising a paint composition;

wherein one or both the first and third layers are present.

In embodiments, the first layer is a primer layer.

In embodiments, the third layer comprises paint.

In embodiments, the second layer has a thickness from about 0.2 mm to about 3 mm.

In embodiments, the adhesion strength of the second layer to the substrate or the first layer is greater than 1.5 MPa for a second layer thickness of 0.5 mm.

In embodiments, the coated substrate according to any one of the herein disclosed embodiments, said coated substrate comprising a fire retardant coating of thickness 0.5 mm, affords a maximum heat release as measured according to AS3837 of less than 100 $kW/m^2$, when the coated substrate is exposed to an irradiance level of 25 $kW/m^2$.

In embodiments, the coated substrate according to any one of the herein disclosed embodiments, said coated substrate comprising a fire retardant coating of thickness 0.5 mm, affords a maximum heat release as measured according to AS3837 of less than 100 $kW/m^2$, when the coated substrate is exposed to an irradiance level of 35 $kW/m^2$.

In embodiments, the coated substrate according to any one of the herein disclosed embodiments, said coated substrate comprising a fire retardant coating of thickness 0.5 mm, affords a maximum heat release as measured according to AS3837 of less than 100 $kW/m^2$, when the coated substrate is exposed to an irradiance level of 50 $kW/m^2$.

In embodiments, the coated substrate according to any one of the herein disclosed embodiments, said coated substrate comprising a fire retardant coating of thickness 0.5 mm, affords an average heat release over 10 minutes following ignition as measured according to AS3837 of less than 60 $kW/m^2$, when the coated substrate is exposed to an irradiance level of 25 $kW/m^2$.

In embodiments, the coated substrate according to any one of the herein disclosed embodiments, said coated substrate comprising a fire retardant coating of thickness 0.5 mm, affords an average heat release over 10 minutes following ignition as measured according to AS3837 of less than 60 $kW/m^2$, when the coated substrate is exposed to an irradiance level of 35 $kW/m^2$.

In embodiments, the coated substrate according to any one of the herein disclosed embodiments, said coated substrate comprising a fire retardant coating of thickness 0.5 mm, affords an average heat release over 10 minutes following ignition as measured according to AS3837 of less than 60 $kW/m^2$, when the coated substrate is exposed to an irradiance level of 50 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the maximum heat release of the weathered coated substrate as measured according to AS3837 is less than 100 $kW/m^2$, when the weathered coated substrate is exposed to an irradiance level of 25 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the maximum heat release of the weathered coated substrate as measured according to AS3837 is less than 100 $kW/m^2$, when the weathered coated substrate is exposed to an irradiance level of 35 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the maximum heat release of the weathered coated substrate as measured according to AS3837 is less than 100 $kW/m^2$, when the weathered coated substrate is exposed to an irradiance level of 50 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the average heat release over 10 minutes following ignition of the weathered coated substrate as measured according to AS3837 is less than 100 $kW/m^2$, when the weathered coated substrate is exposed to an irradiance level of 25 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the average heat release over 10 minutes following ignition of the weathered coated substrate as measured according to AS3837 is less than 100 $kW/m^2$, when the weathered coated substrate is exposed to an irradiance level of 35 $kW/m^2$.

In embodiments, when the coated substrate according to any one of the herein disclosed embodiments, said coated substrate comprising a fire retardant coating of thickness 0.5 mm, is subjected to 1000 hours accelerated weathering according to ASTM D-2898 (Method B), the average heat release over 10 minutes following ignition of the weathered coated substrate as measured according to AS3837 is less than 100 $kW/m^2$, when the weathered coated substrate is exposed to an irradiance level of 50 $kW/m^2$.

Advantages of the presently disclosed fire retardant paint compositions or coatings include one or more of the following:

they possess excellent adhesion to a variety of substrates;

they provide excellent protection to a substrate against fire;

they provide excellent weather resistance; and on combustion, low amounts of toxic gas are formed.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, compositions and processes are clearly within the scope of the disclosure, as described herein.

Further aspects of the present disclosure and further embodiments of the aspects described in the preceding paragraphs will become apparent from the following description, given by way of example and with reference to the accompanying drawings.

BRIEF DESCRIPTION OF THE DRAWINGS

FIG. 1 shows photographs of the condition of samples before and after 1000 hrs weathering, and tested with a cone calorimeter at a heat flux intensity of 25 $kW/m^2$.

FIG. 3 shows photographs of the condition of samples before and after 1000 hrs weathering, and tested with a cone calorimeter at a heat flux intensity of 50 $kW/m^2$.

DETAILED DESCRIPTION OF THE EMBODIMENTS

Figure 2:
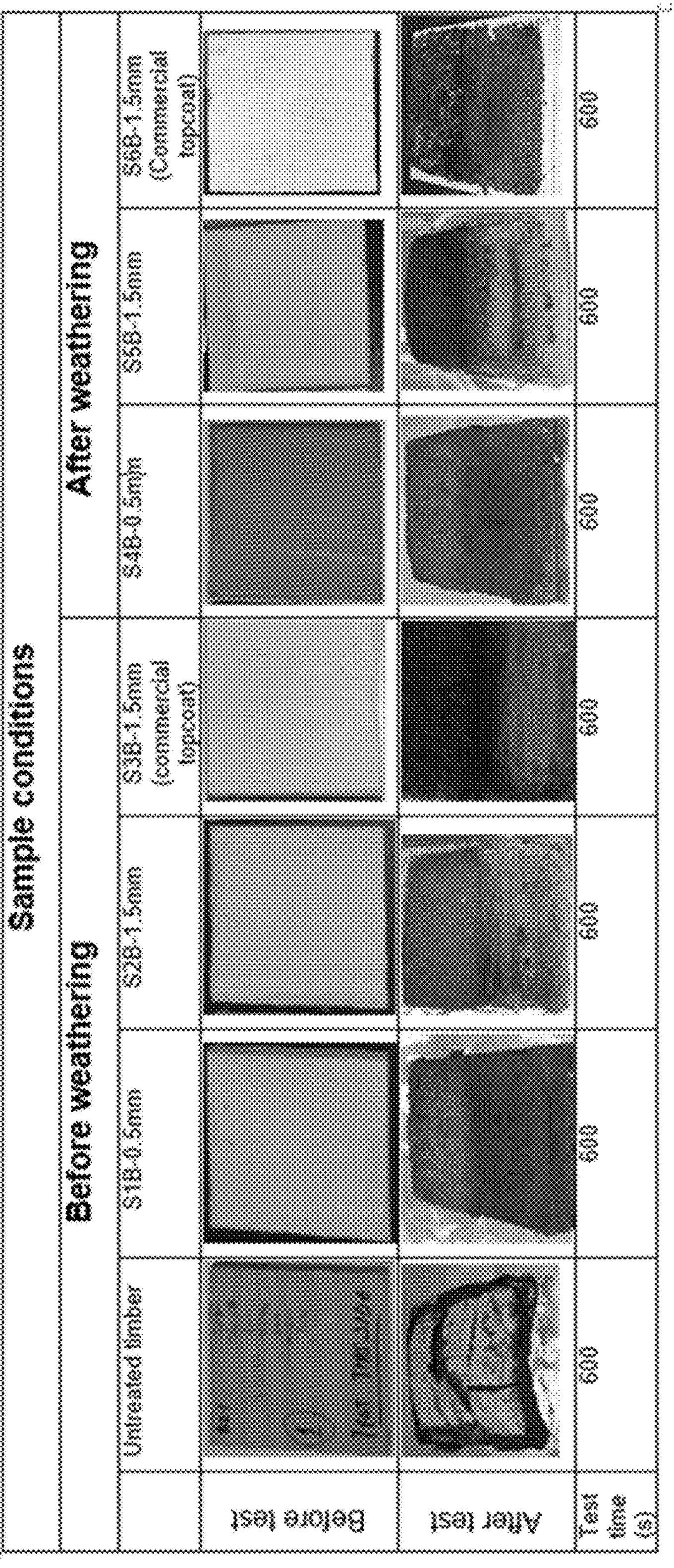
FIG. 2 shows photographs of the condition of samples before and after 1000 hrs weathering, and tested with a cone calorimeter at a heat flux intensity of 35 $kW/m^2$.

It will be understood that the disclosure described and defined in this specification extends to all alternative combinations of two or more of the individual features mentioned or evident from the text or drawings. All of these different combinations constitute various alternative aspects of the disclosure.

Definitions

For purposes of interpreting this specification, terms used in the singular will also include the plural and vice versa.

As used herein, except where the context requires otherwise, the term "comprise" and variations of the term, such as "comprising", "comprises" and "comprised", are not intended to exclude further additives, components, integers or steps.

"About" as used herein when referring to a measurable value such as an amount, a temporal duration, and the like, is meant to encompass variations of ±20% or ±10%, in some instances ±5%, in some instances ±1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The present disclosure relates to fire retardant paint compositions comprising acrylic modified polysiloxane binders, expandable graphite, polyphosphate salts having a solubility in water of less than 2 wt. % at 20° C., and fire retardant additives. The paint compositions are useful in protecting substrates from fire.

The present disclosure provides a fire retardant paint composition comprising:

(a) about 15 wt. % to about 50 wt. % of one or more acrylic modified polysiloxane binders;
(b) about 5 wt. % to about 30 wt. % expandable graphite;
(c) about 5 wt. % to about 30 wt. % of one or more polyphosphate salts having a solubility in water of less than 2 wt. % at 20° C.,
(d) about 5 wt. % to about 30 wt. % of one or more fire retardant additives; and the balance being water to 100 wt. %;
wherein the one or more acrylic modified polysiloxanes comprise a siloxane backbone functionalised with acrylic groups.

In embodiments, the fire retardant paint composition comprises:

(a) about 20 wt. % to about 45 wt. % of one or more acrylic modified polysiloxane binders;
(b) about 10 wt. % to about 20 wt. % expandable graphite;
(c) about 5 wt. % to about 20 wt. % of one or more polyphosphate salts having a solubility in water of less than 2 wt. % at 20° C.,
(d) about 5 wt. % to about 20 wt. % of one or more fire retardant additives; and the balance being water to 100 wt. %.

In embodiments, the fire retardant paint composition comprises:

(a) about 25 wt. % to about 40 wt. % of one or more acrylic modified polysiloxane binders;
(b) about 10 wt. % to about 20 wt. % expandable graphite;
(c) about 5 wt. % to about 20 wt. % of one or more polyphosphate salts having a solubility in water of less than 2 wt. % at 20° C.,
(d) about 5 wt. % to about 20 wt. % of one or more fire retardant additives; and the balance being water to 100 wt. %.

The present disclosure also provides a fire retardant coating comprising:

(a) about 20 wt. % to about 60 wt. % of one or more acrylic modified polysiloxane binders;
(b) about 10 wt. % to about 30 wt. % expandable graphite;
(c) about 5 wt. % to about 30 wt. % of one or more polyphosphate salts having a solubility in water of less than 2 wt. % at 20° C., and
(d) about 5 wt. % to about 30 wt. % of one or more fire retardant additives;

wherein the one or more acrylic modified polysiloxanes comprise a siloxane backbone functionalised with acrylic groups.

In embodiments, the fire retardant coating comprises:

(a) about 25 wt. % to about 55 wt. % of one or more acrylic modified polysiloxane binders;
(b) about 15 wt. % to about 25 wt. % expandable graphite;
(c) about 10 wt. % to about 20 wt. % of one or more polyphosphate salts having a solubility in water of less than 2 wt. % at 20° C., and
(d) about 10 wt. % to about 20 wt. % of one or more fire retardant additives.

In embodiments, the fire retardant coating comprises:

(a) about 30 wt. % to about 50 wt. % of one or more acrylic modified polysiloxane binders;
(b) about 15 wt. % to about 25 wt. % expandable graphite;
(c) about 10 wt. % to about 20 wt. % of one or more polyphosphate salts having a solubility in water of less than 2 wt. % at 20° C., and
(d) about 10 wt. % to about 20 wt. % of one or more fire retardant additives.

Acrylic Modified Polysiloxane

The acrylic modified polysiloxane serves as a polymeric binder in the presently disclosed fire retardant paint composition and coating.

In embodiments, the one or more acrylic modified polysiloxanes comprise one or more of acrylic modified polydimethylsiloxane, acrylic modified polymethylhydrogensiloxane, acrylic modified polydiethylsiloxane, acrylic modified polyphenylmethylsiloxane, and acrylic modified polydiphenylsiloxane.

In embodiments, the one or more acrylic modified polysiloxanes comprise acrylic modified polydimethylsiloxane.

In embodiments, the one or more acrylic modified polysiloxanes comprise about 0.5 wt. % to about 10 wt. % acrylate groups, or about 0.5 wt. % to about 8 wt. %, or about 0.5 wt. % to about 6 wt. %, or about 0.5 wt. % to about 4 wt. %, or about 0.5 wt. % to about 3 wt. %, or about 1 wt. % to about 5 wt. %, or about 1 wt. % to about 3 wt. % acrylate groups.

The acrylic modified polysiloxanes may be prepared by treating a polysiloxane with acrylic acid using methods well known in the art.

In embodiments, the amount of one or more acrylic modified polysiloxane binders in the fire retardant paint composition is about 15 wt. % to about 50 wt. %, or about 20 wt. % to about 45 wt. %, or about 25 wt. % to about 40 wt. %, or about 28 wt. % to about 35 wt. %, based on the total weight of the fire retardant paint composition.

In embodiments, the amount of one or more acrylic modified polysiloxane binders in the fire retardant coating is about 20 wt. % to about 60 wt. %, or about 25 wt. % to about 55 wt. %, or about 30 wt. % to about 50 wt. %, or about 35 wt. % to about 45 wt. %, based on the total weight of the fire retardant coating.

Expandable Graphite

Expandable graphites are graphites in which the interstitial layers contain foreign groups (for example sulfuric acid) which lead to thermal expansion. They include nitrosated, oxidised and halogenated graphites. The expandable graphite expands when in a temperature range of from 80° C. to 250° C. or more, expanding the composition so that it forms an insulating char layer on the substrate.

In embodiments, the amount of expandable graphite in the presently disclosed fire retardant paint composition is about 5 wt. % to about 30 wt. %, or about 10 wt. % to about 30 wt. %, or about 5 wt. % to about 20 wt. %, or about 10 wt. % to about 20 wt. %, based on the total weight of the fire retardant paint composition.

In embodiments, the amount of expandable graphite in the presently disclosed fire retardant paint coating is about 10 wt. % to about 30 wt. %, or about 12 wt. % to about 28 wt. %, or about 15 wt. % to about 25 wt. %, based on the total weight of the fire retardant paint coating.

Polyphosphate Salt

Polyphosphate salt fire retardants may include ammonium polyphosphate (Type II) or melamine polyphosphate.

In embodiments, the one or more polyphosphate salts may have a solubility in water of less than 1 wt. % at 20° C., or less than 0.5 wt. % at 20° C.

In embodiments, the one or more polyphosphate salts comprise a particulate polyphosphate having an average particle size (D50) of 5 to 50 micron, preferably 10 to 30 micron. The average particle size may be determined by, for example, laser diffraction.

The amount of polyphosphate salt in the fire retardant paint composition is about 5 wt. % to about 30 wt. %, or about 10 wt. % to about 30 wt. %, or about 5 wt. % to about 20 wt. %, or about 10 wt. % to about 20 wt. %, based on the total weight of the fire retardant paint composition.

The amount of polyphosphate salt in the fire retardant paint coating is about 5 wt. % to about 30 wt. %, or about 10 wt. % to about 30 wt. %, or about 5 wt. % to about 20 wt. %, or about 10 wt. % to about 20 wt. %, based on the total weight of the fire retardant paint coating.

Fire Retardant Additives

In embodiments, the one or more fire retardant additives comprise one or more of aluminium trihydrate, basic magnesium carbonate, and magnesium dihydroxide.

In some preferred embodiments, the one or more fire retardant additives comprise aluminium trihydrate.

The amount of fire retardant additives in the fire retardant paint composition is about 5 wt. % to about 30 wt. %, or about 10 wt. % to about 30 wt. %, or about 5 wt. % to about 20 wt. %, or about 10 wt. % to about 20 wt. %, based on the total weight of the fire retardant paint composition.

The amount of fire retardant additives in the fire retardant paint coating is about 5 wt. % to about 30 wt. %, or about 10 wt. % to about 30 wt. %, or about 5 wt. % to about 20 wt. %, or about 10 wt. % to about 20 wt. %, based on the total weight of the fire retardant paint coating.

Auxiliaries

In embodiments, the fire retardant paint composition or coating further comprises one or more auxiliaries selected from pigments, UV resistance additives, wetting agents, dispersing agents, biocides, rheology modifiers, coalescents, defoamers, and thickeners.

Suitable pigments include, for example, titanium dioxide. Other pigments known in the art are contemplated. The pigments may also possess UV resistance properties.

The amount of pigments present in the fire retardant paint composition or coating is typically from about 1 wt. % to about 6 wt. %, based on the total weight of the fire retardant paint composition or coating.

Suitable wetting agents include, for example, polyether modified polysiloxanes. Other wetting agents known in the art are contemplated.

The amount of wetting agents present in the fire retardant paint composition or coating is typically less than about 2 wt. %, or about 1 wt. % to about 2 wt. %, based on the total weight of the fire retardant paint composition or coating.

Suitable dispersing agents include, for example, Disperbyk® 2080, a modified styrene maleic acid copolymer. Other dispersing agents known in the art are contemplated.

The amount of dispersing agents present in the fire retardant paint composition or coating is typically less than about 3 wt. %, or about 1 wt. % to about 3 wt. %, based on the total weight of the fire retardant paint composition or coating.

Suitable biocides include, for example, biocides such as Acticide® FS(N). Other biocides known in the art are contemplated.

The amount of biocide present in the fire retardant paint composition or coating is typically less than about 2 wt. %, or about 0.2 wt. % to about 0.5 wt. %, based on the total weight of the fire retardant paint composition or coating.

Suitable coalescents include, for example, ester alcohols. Other coalescents known in the art are contemplated.

The amount of coalescent present in the fire retardant paint composition or coating is typically less than about 5 wt. %, or about 2 wt. % to about 5 wt. %, based on the total weight of the fire retardant paint composition or coating.

Suitable defoamers include, for example, silicone containing defoamers. Other defoamers known in the art are contemplated.

The amount of defoamer present in the fire retardant paint composition or coating is typically less than about 2 wt. %, or about 0.5 wt. % to about 2 wt. %, based on the total weight of the fire retardant paint composition or coating.

Suitable thickeners include, for example, polyurethane solution, such as Rheobyk-H 6500 VF, or cellulose ethers. Other thickeners known in the art are contemplated.

The amount of thickener present in the fire retardant paint composition or coating is typically less than about 2 wt. %, or about 0.5 wt. % to about 2 wt. %, based on the total weight of the fire retardant paint composition or coating.

Method of Preparing the Fire Retardant Paint Compositions

The presently disclosed fire retardant paint compositions may be prepared by combining one or more acrylic modified polysiloxanes, expandable graphite, one or more polyphosphate salts, one or more fire retardant additives, one or more auxiliaries (if present) and water.

Preferably, the composition is subjected to high shear mixing.

Use of the Fire Retardant Paint Compositions

There is also provided a method of protecting a substrate against fire comprising the step of coating the substrate with the fire retardant paint composition according to any one of the herein disclosed embodiments.

In embodiments, the substrate is coated by means of spraying or brushing.

In embodiments, the substrate is timber, brick, concrete or metal.

There is also provided the use of the fire retardant composition according to any one of the herein disclosed embodiments in protecting a substrate against fire.

Coated Substrates

There is provided a coated substrate wherein the coating comprises the fire retardant coating according to any one of the herein disclosed embodiments and the coating is in direct contact with the substrate.

In embodiments, the substrate is timber, brick, concrete or metal. In such embodiments the fire retardant coating according to the present disclosure is in direct contact with the timber, brick, concrete or metal.

In embodiments, the coating has a thickness from about 0.2 mm to about 3 mm,

In embodiments, the adhesion strength of the coating to the substrate is greater than 1.5 MPa for a coating thickness of 0.5 mm.

There is also provided a coated substrate wherein the coating comprises a multilayer structure said multilayer structure comprising:

an optional first layer comprising a paint composition in contact with the substrate;

a second layer disposed atop the substrate or the first layer, said second layer comprising the fire retardant coating according to any one of the herein disclosed embodiments; and an optional third layer disposed atop the second layer, said third layer comprising a paint composition;

wherein one or both the first and third layers are present.

In embodiments, the first layer is a primer layer.

In embodiments, the third layer comprises paint.

In embodiments, the second layer has a thickness from about 0.2 mm to about 3 mm.

In embodiments, the adhesion strength of the second layer to the substrate or the first layer is greater than 1.5 MPa for a second layer thickness of 0.5 mm.

Advantageously it has been found that the fire retardant coating of the present disclosure strongly adheres to not only an untreated substrate, such as timber, brick, concrete or metal, but also to substrates pretreated with another coating, such as a primer.

EXAMPLES

Example 1: Assessment of Adhesive Strength

The adhesion strength of fire retardant coatings was measured using a Pull-off Adhesion tester (Automatic Positest AT-A) according to ASTM D4541-09, which is widely used for measuring adhesion of coatings to wood, metal, concrete and other rigid substrates.

Fire retardant paint compositions according to the present disclosure were prepared by combining about 20 wt. % to about 40 wt. % of one or more acrylic modified polysiloxane binders (solids based weight); about 10 wt. % to about 20 wt. % expandable graphite; about 10 wt. % to about 20 wt. % of one or more polyphosphate salts having a solubility in water of less than 2 wt. % at 20° C., and about 10 wt. % to about 20 wt. % of one or more fire retardant additives; optional auxiliaries; and the balance being water to 100 wt. %. Typically the total water content was from about 15 wt. % to about 25 wt. %. The components were mixed under high shear conditions, typically at 400 rpm for about 15 minutes.

The fire retardant paint compositions were applied on different substrates, including bare timber, timber coated with a commercial primer or commercial exterior paint, and aluminium coated with Colourbond® coating. All the substrates or pre-coated substrates were coated with fire retardant paint composition to a thickness of 0.5 mm. The resulting fire retardant coatings showed good adhesion on all these substrates or pre-coated substrates. 1.6-1.8 MPa adhesion strength was measured for timber initially coated with commercial primer and paint, 1.7-2.0 MPa on bare timber, and 3 MPa on aluminium coated with Colourbond® coating.

The adhesion strength can be affected by the thickness of the coating, however it is significant that the adhesion strength of the fire retardant coatings of the present disclosure was above 1.5 MPa for 0.5 mm thickness of coating, which is considered a strong adhesion.

Example 2: Cone Calorimeter Tests

A cone calorimeter was used to investigate the fire behaviour of various materials. It works on the principle that the amount of heat released by a burning sample (100×100×4 $mm^3$) subjected to a given heat flux (i.e., 10-100 $kW/m^2$) is proportional to the amount of oxygen consumption during combustion. The amount of heat produced by a material is directly related to the severity of a fire. Heat release rate (HRR), total heat release (THR), time to ignition (TTI), mass loss rate (MLR), total smoke release (TSR), and effective heat of combustion (EHC) are among the combustibility parameters provided by the test (The cone calorimeter is used for certification according to the Australian standard AS 3959 for a BAL-29 rating (25 $kW/m^2$). The higher BAL ratings (BAL-40 and BAL-FZ) require a large scale-scale test according to the AS 1530.8.1. Fire retardant coatings were tested at different heat flux (25 $kW/m^2$, 35 $kW/m^2$ and 50 $kW/m^2$) using a cone calorimeter.

25 $kW/m^2$ Heat Flux Tests

The fire retardant paint composition of the present disclosure was applied on timber substrates of 100 mm×100 mm×20 mm at a coating thickness of 0.5 mm. The composition was applied with a paint brush and the thickness was controlled with the number of passes and a thickness gauge. In addition, for some samples a commercial exterior topcoat paint was applied on the fire retardant paint composition painted samples. All the samples were dried at room temperature.

Timber samples coated with the fire retardant paint compositions were tested with a cone calorimeter at a heat flux intensity of 25 $kW/m^2$ (equivalent to BAL-29) with and without commercial topcoat. The purpose of the tests was to assess the suitable coating conditions for a specific bushfire attack level (BAL). From these tests, sample responses such as heat release rate (HRR), total smoke production (TSP) and mass loss rate (MLR) were considered for assessing the sample performance. Samples were also exposed to accelerated weathering conditions for 1000 hours. The weathering conditions simulated that specified by ASTM D2898 Method B using a QUV accelerated weathering tester.

The test according to AS3959 for a BAL-29 rate, considers a maximum peak heat release rate (P-HRR) of 100 $kW/m^2$ and a mean heat release rate (M-HRR) below 60 $kW/m^2$ during the first 10 min of the test as the two main criteria to satisfy the requirements of the standard. Table 1 shows the data collected after samples tested with the cone calorimeter at a heat flux intensity of 25 $kW/m^2$ for 10 mins.

TABLE 1

| Cone calorimeter test parameters | Sample condition | | | |
|---|---|---|---|---|
| | Before weathering | | After weathering | |
| | S1A-0.5 mm | S2A-0.5 mm (Commercial topcoat) | S3A-0.5 mm | S4A-0.5 mm (commercial topcoat) |
| P-HRR (Kw/m$^2$) | 9.541 | 47.294 | 23.56 | 53.255 |
| t-peak HHR (s) | 550 | 150 | 65 | 110 |
| Mean HRR (Kw/m$^2$) | 2.118 | 5.629 | 13.39 | 3.593 |
| Mean MLR (g/s) | 0.012 | 0.023 | 0.024 | 0.024 |
| TSP (m$^2$) | 0.35 | 0.778 | 0.522 | 0.704 |
| Time of exposure (s) | 600 | 600 | 600 | 600 |

The P-HRR of the samples was low, compared with the criteria given by the AS3959 (100 kW/m$^2$ max). Despite the samples S2A and S4A giving higher P-HRR, these values are much lower than the max P-HRR required by the AS 3959-BAL 29 (100 kW/m$^2$). A visual inspection of the samples after the test was also performed as a qualitative evaluation of the physical integrity of the samples. FIG. 1 shows the sample conditions before and after 1000 hrs weathering, and before and after testing with the cone calorimeter. The surfaces were not significantly affected by the accelerated weathering and the timber substrate did not evidence significant changes and/or degradation after the cone calorimeter test (FIG. 1), suggesting that the measured P-HRR is mostly contributed by the fire retardant coating ignition rather than the degradation process of the timber.

35 kW/m$^2$ Heat Flux Tests

Table 2 shows the cone calorimeter results of uncoated and coated timber with two different thickness of fire retardant paint composition (0.5 mm and 1.5 mm) with and without commercial topcoat and before and after the accelerated weathering, tested at a heat flux intensity of 35 kW/m$^2$ (equivalent to BAL-40). It can be seen that the uncoated timber reported the highest peak heat release followed by samples with commercial topcoat. Samples coated with the fire retardant coating of the present disclosure before and after weathering protected the timber even with a 0.5 mm thick coating. The mass loss rate (MLR) is used as an indicator for estimating the intensity of the sample degradation. The uncoated sample gave the highest Mean-MLR, followed by samples coated with commercial topcoat. The conditions of the samples before and after the test are shown in FIG. 2. The uncoated sample was severely degraded during the 10 minute test.

TABLE 2

| Cone calorimeter test parameters | Sample condition | | | | | | |
|---|---|---|---|---|---|---|---|
| | Before weathering | | | | After weathering | | |
| | Uncoated | S1B-0.5 mm | S2B-1.5 mm | S3B-1.5 mm (Commercial topcoat) | S4B-0.5 mm | S5B-1.5 mm | S6B-1.5 mm (Commercial topcoat) |
| Peak-HRR (Kw/m2) | 176.66 | 35.791 | 25.058 | 70.65 | 23.56 | 31.23 | 80.55 |
| t-peak HRR (s) | 55 | 78 | 80 | 80 | 65 | 75 | 60 |
| Mean HRR (Kw/m2) | 70.79 | 29.41 | 5.64 | 10.96 | 13.39 | 19.37 | 15.21 |
| Mean MLR (g/s) | 0.045 | 0.022 | 0.020 | 0.024 | 0.024 | 0.019 | 0.035 |
| TSP (m2) | 1.49 | 0.53 | 0.76 | 0.397 | 0.522 | 0.96 | 0.497 |
| Time of exposure | 600 | 600 | 600 | 600 | 558 | 600 | 600 |

50 kW/m$^2$ Heat Flux Tests

Table 3 shows the cone calorimeter results of coated timber with 0.5 mm thickness of fire retardant coating according to the present disclosure with and without commercial topcoat, and before and after the accelerated weathering, tested at a heat flux intensity of 50 kW/m$^2$. Samples coated with the fire retardant coating of the present disclosure before and after weathering protected the timber even with a 0.5 mm thick coating. The mass loss rate (MLR) is used as an indicator for estimating the intensity of the sample degradation. The conditions of the samples before and after the test are shown in FIG. 3.

TABLE 3

| Cone calorimeter test parameters | Sample condition | | | |
|---|---|---|---|---|
| | Before weathering | | After weathering | |
| | S1C-0.5 mm | S2C-1.5 mm (Commercial topcoat) | S3C-0.5 mm | S4C-1.5 mm (commercial topcoat) |
| P-HRR (Kw/m$^2$) | 51.88 | 31.22 | 86.30 | 80.30 |
| t-peak HHR (s) | 310 | 550 | 130 | 150 |
| Mean HRR (Kw/m$^2$) | 25.25 | 19.82 | 62.14 | 70.07 |
| Mean MLR (g/s) | 0.038 | 0.025 | 0.064 | 0.075 |
| TSP (m$^2$) | 0.3 | 0.073 | 0.76 | 0.29 |
| Time of exposure (s) | 600 | 600 | 600 | 600 |

Example 4: Evaluation of Toxic Gas Release

Cone calorimeter-FTIR was performed on a timber substrate coated with 1 mm thickness of a fire retardant coating of the present disclosure. The purpose of the test was to determine the amount of toxic gases released during combustion. The results are collected in Table 4.

Carbon monoxide (CO) was the main gas generated from the material, however the concentration was low. All remaining gases were found in even lower concentrations.

TABLE 4

| Gas | Formula | Peak gas concentration (ppm) during burning for 10 min in Cone |
|---|---|---|
| Carbon monoxide | CO | 67.58 |
| Nitric oxide | NO | 1.50 |
| Nitrogen dioxide | $NO_2$ | 2.64 |
| Nitrous oxide | $N_2O$ | 0.79 |
| Sulfur dioxide | $SO_2$ | 2.29 |
| Hydrogen chloride | HCl | 38.54 |
| Hydrogen cyanide | HCN | 5.82 |

TABLE 4-continued

| Gas | Formula | Peak gas concentration (ppm) during burning for 10 min in Cone |
|---|---|---|
| Hydrogen bromide | HBr | 1.66 |
| Hydrogen fluoride | HF | 0.87 |
| Ammonia | $NH_3$ | 9.27 |
| Formaldehyde | HCHO | 7.27 |
| Phenol | $C_6H_5OH$ | 6.04 |

Example 5

A series of alternative fire retardant paint compositions were tested to compare performance against the presently disclosed compositions, and the formulations and results are collected in Table 5.

The compositions were prepared with different polymeric binders, including water borne epoxy, water borne polyurethane, water borne polysiloxane and several different acrylic-based liquid and powder binders, as shown in Table 5, and in all formulations the amount of binder was 20-40 wt. % (based on the actual binder content), the amount of APP was 5-20 wt. %, the amount of ATH (when used) was 5-15 wt. %, and the amount of EG (when used) was 2-20 wt. %. The balance was water and auxiliaries.

The compositions were applied to timber with a layer thickness of 0.5 mm or 1 mm and the resulting coatings were subjected to adhesion testing and cone calorimeter testing (substrate protection) at a heat flux of 25 $kW/m^2$. Formulations were rated as poor, good or excellent based on results of these tests. Weathering tests were also performed on all formulations that gave excellent results in the substrate protection tests (before weathering).

TABLE 5

| Formula | Binder | Other components* | Adhesion strength | Substrate protection | Weathering resistance | Substrate protection after weathering |
|---|---|---|---|---|---|---|
| Formula-1 | Acrylic paint binder | ATH and Melamine | Poor | Poor | Not tested | Not tested |
| Formula-2 | Acrylic paint binder | APP, Penta and Melamine | Poor | Good | Not tested | Not tested |
| Formula-3 | Water borne epoxy | APP, Penta and Melamine | Poor | Good | Not tested | Not tested |
| Formula-4 | Water borne epoxy | APP, ATH, $SiO_2$ and Melamine | Poor | Poor | Not tested | Not tested |
| Formula-5 | Water borne polyurethane | APP, Penta and Melamine | Good | Good | Not tested | Not tested |
| Formula-6 | Water borne polyurethane | MPP, ATH and $TiO_2$ | Good | Good | Not tested | Not tested |
| Formula-7 | Polyvinyl acetate | APP, Penta, $TiO_2$ and Melamine | Good | Good | Not tested | Not tested |
| Formula-8 | Polyvinyl acetate | APP, $TiO_2$, and EG | Good | Good | Not tested | Not tested |
| Formula-9 | Polysiloxane | ATH and melamine | Poor | Poor | Not tested | Not tested |
| Formula-10 | Polysiloxane | APP, Penta and Melamine | Poor | Poor | Not tested | Not tested |
| Formula-11 | Polysiloxane | APP, ATH, $TiO_2$ and EG | Poor | Excellent | Excellent | Excellent |
| Formula-12 | Acrylic modified polysiloxane | APP, Penta, $TiO_2$ and Melamine | Excellent | Good | Not tested | Not tested |
| Formula-13 | Acrylic modified polysiloxane | APP, $TiO_2$ and EG | Excellent | Good | Not tested | Not tested |
| Formula-14 | Acrylic modified polysiloxane | MPP, ATH, $TiO_2$ and EG | Excellent | Excellent | Excellent | Excellent |
| Formula-15 | Acrylic modified polysiloxane | APP, ATH, $TiO_2$ and EG | Excellent | Excellent | Excellent | Excellent |
| Formula-16 | Acrylic modified polysiloxane | APP, ATH, and EG | Excellent | Excellent | Excellent | Excellent |

*ATH: Aluminium Trihydroxide
EG: Expandable Graphite
MMP: Melamine Polyphosphate
APP: Ammonium Polyphosphate
$TiO_2$: Titanium Dioxide
$SiO_2$: Silicone Dioxide
Penta: Pentaerythritol It can be seen that formulations using acrylic paint binder and water borne epoxy binder performed relatively poorly across all tests. Adhesion to the substrate was poor and heat flux performance (substrate protection) was, at best, good.

Formulations based on water borne polyurethane or polyvinyl acetate binders, while showing improved adhesion and substrate protection, afforded average performance.

Formulations based on polysiloxane binders had poor adhesion.

The binder of the presently disclosed compositions is an acrylic modified polysiloxane. Formulae 12 to 16 all utilised this binder and all exhibited excellent adhesion to the substrate.

Formulae 14 to 16 are according to the present disclosure and also comprise ammonium polyphosphate or melamine polyphosphate, expandable graphite, and aluminium trihydrate. It is evident from the results that, of the compositions examined, only coatings comprising all of these components enable excellent performance in terms of all of adhesion strength, substrate protection against fire, and weathering resistance.

Example 6

Timber samples of identical dimensions (100 mm×100 mm×2 mm) were coated with different fire retardant paint compositions to afford a fire retardant coating thickness of 1 mm. The paint compositions were similar to Formula-16 of Example 5, except that ATH was replaced with melamine, magnesium carbonate, or magnesium hydroxide. The samples were tested with a cone calorimeter at a heat flux 50 $kW/m^2$ for 10 mins. From these tests, sample responses such as heat release rate (HRR), total smoke production (TSP) and mass loss rate (MLR) were assessed. The formulations and results are collected in Table 6.

TABLE 6

| Fire retardant additive | Mean HRR ($kW/m^2$) | Peak HRR ($kW/m^2$) | Time to Peak HRR (s) | Mean MLR (g/s) | Total smoke production (TSP $m^2$) | Time to ignition (s) | Exposure time (S) |
|---|---|---|---|---|---|---|---|
| Melamine | 12.84 | 48.62 | 35 | 0.0224 | 0.233 | 15 | 600 |
| Magnesium carbonate | 10.25 | 41.01 | 35 | 0.0171 | 0.012 | 32 | 600 |
| Magnesium Hydroxide | 5.74 | 8.99 | 160 | 0.0125 | 0.029 | 158 | 600 |
| ATH | 1.15 | 3.15 | 155 | 0.0176 | 0.085 | No ignition | 600 |

From the results, the fire retardant coating with ATH showed the best results with very low mean heat release rate of 1.15 $kW/m^2$, followed by magnesium hydroxide, magnesium carbonate, and melamine. Melamine afforded a much higher total smoke production, and much shorter time to ignition, compared to the other additives.

The invention claimed is:

1. A fire retardant paint composition comprising:

a) about 20 wt. % to about 40 wt. % of one or more acrylic modified polysiloxane binders, wherein the one or more acrylic modified polysiloxane binders comprise a siloxane backbone functionalized with about 0.5 wt. % to about 10 wt. % acrylic groups;

b) about 5 wt. % to about 20 wt. % expandable graphite;

c) about 5 wt. % to about 20 wt. % of one or both of ammonium polyphosphate or melamine polyphosphate having a solubility in water of less than 2 wt. % at 20° C.;

d) about 5 wt. % to about 15 wt. % of aluminium trihydrate; and e) about 10 wt. % to about 30 wt. % water.

2. The fire retardant paint composition according to claim 1 comprising:

a) about 20 wt. % to about 40 wt. % one or more acrylic modified polysiloxane binders;

b) about 10 wt. % to about 20 wt. % expandable graphite;

c) about 5 wt. % to about 20 wt. % of one or both of ammonium polyphosphate or melamine polyphosphate having a solubility in water of less than 2 wt. % at 20° C.;

d) about 5 wt. % to about 15% wt. % of aluminium trihydrate; and e) about 10 wt. % to about 30 wt. % water.

3. The fire retardant paint composition according to claim 1, wherein the one or more acrylic modified polysiloxane binders comprise one or more of acrylic modified polydimethylsiloxane, acrylic modified polymethylhydrogensiloxane, acrylic modified polydiethylsiloxane, acrylic modified polyphenylmethylsiloxane, and acrylic modified polydiphenylsiloxane.

4. The fire retardant paint composition according to claim 1, wherein the one or more acrylic modified polysiloxane binders comprise acrylic modified polydimethylsiloxane.

5. The fire retardant paint composition according to claim 1, wherein one or both of ammonium polyphosphate or melamine polyphosphate comprise a particulate polyphosphate having an average particle size (D50) of 5 to 50 micron.

6. The fire retardant paint composition according to claim 1, further comprising one or more auxiliaries selected from pigments, UV resistance additives, wetting agents, dispersing agents, biocides, rheology modifiers, coalescents, defoamers, and thickeners.

7. The fire retardant paint composition according to claim 1, wherein (e) comprises about 15 wt. % to about 25 wt. % water.

8. A method of protecting a substrate or a coated substrate against fire comprising the step of coating the substrate or the coated substrate with the fire retardant paint composition according to claim 1.

9. The method according to claim 8, wherein the substrate or the coated substrate is coated with the fire retardant paint composition by means of spraying or brushing.

* * * * *